(12) United States Patent
Wayts

(10) Patent No.: US 7,544,057 B1
(45) Date of Patent: Jun. 9, 2009

(54) MOLDING SYSTEM

(76) Inventor: Thomas A Wayts, 12441 Lincoln St., Paris, OH (US) 44669

( * ) Notice: Subject to any disclaimer, the term of this patent is extended or adjusted under 35 U.S.C. 154(b) by 732 days.

(21) Appl. No.: 10/984,632

(22) Filed: Nov. 9, 2004

(51) Int. Cl.
B29C 45/04 (2006.01)

(52) U.S. Cl. ................................. 425/575; 264/328.7

(58) Field of Classification Search ............... 425/574, 425/575; 264/328.7, 328.11
See application file for complete search history.

(56) References Cited

U.S. PATENT DOCUMENTS

| | | | |
|---|---|---|---|
| 2,280,022 A * | 4/1942 | Banigan et al. ............. 264/49 |
| 2,696,023 A * | 12/1954 | Stott .................... 264/328.16 |
| 3,513,507 A * | 5/1970 | Boultinghouse ............ 425/4 R |
| 3,733,157 A | 5/1973 | Hendry ....................... 425/149 |
| 4,431,393 A | 2/1984 | Luchsinger ............. 425/129 R |
| 4,477,406 A | 10/1984 | Luchsinger ................. 264/275 |
| 4,493,631 A * | 1/1985 | Dieckmann et al. ......... 425/292 |
| 4,540,540 A | 9/1985 | Jackson et al. ......... 264/272.11 |
| 4,592,716 A | 6/1986 | Jackson et al. ............. 425/330 |
| 4,849,151 A | 7/1989 | Tamura et al. ............. 264/294 |
| 5,010,122 A | 4/1991 | Koski ......................... 524/80 |
| 5,094,905 A | 3/1992 | Murray ....................... 428/218 |
| 5,238,734 A | 8/1993 | Murray ....................... 428/292 |
| 5,604,277 A | 2/1997 | Osborn ....................... 524/270 |
| 5,636,551 A | 6/1997 | Davidson et al. ........... 74/502.5 |
| 5,656,234 A | 8/1997 | Kaneishi et al. ............. 264/572 |
| 5,811,135 A | 9/1998 | Kimura ....................... 425/186 |
| 5,886,078 A | 3/1999 | Sullivan et al. ............. 524/449 |
| 6,042,364 A | 3/2000 | Nishida ....................... 425/574 |
| 6,169,128 B1 | 1/2001 | Vivaudou .................... 523/129 |
| 6,217,813 B1 | 4/2001 | Sorensen et al. ......... 264/328.1 |
| 6,248,281 B1 | 6/2001 | Abe et al. ................. 264/328.7 |
| 6,583,211 B1 | 6/2003 | Wayts ......................... 524/495 |
| 2003/0204002 A1 | 10/2003 | Osborn ....................... 524/270 |
| 2004/0026677 A1 | 2/2004 | Tikalsky .................... 256/13.1 |

FOREIGN PATENT DOCUMENTS

GB 1 586 882 3/1981

* cited by examiner

*Primary Examiner*—Jill L Heitbrink
(74) *Attorney, Agent, or Firm*—Renner, Kenner, Greive, Bobak, Taylor & Weber

(57) ABSTRACT

A molding system for forming an article of composite material including a track, a mold supported on the track, the mold defining a mold cavity, an injection tube supported adjacent the mold and in fluid communication with the mold cavity, the injection tube being fluidly connected to a source of the composite material, wherein the composite material is fed into the mold cavity via the injection tube and wherein the mold is adapted to move injection tube as the composite material is fed into the mold progressively increasing the volume of the mold cavity.

8 Claims, 2 Drawing Sheets

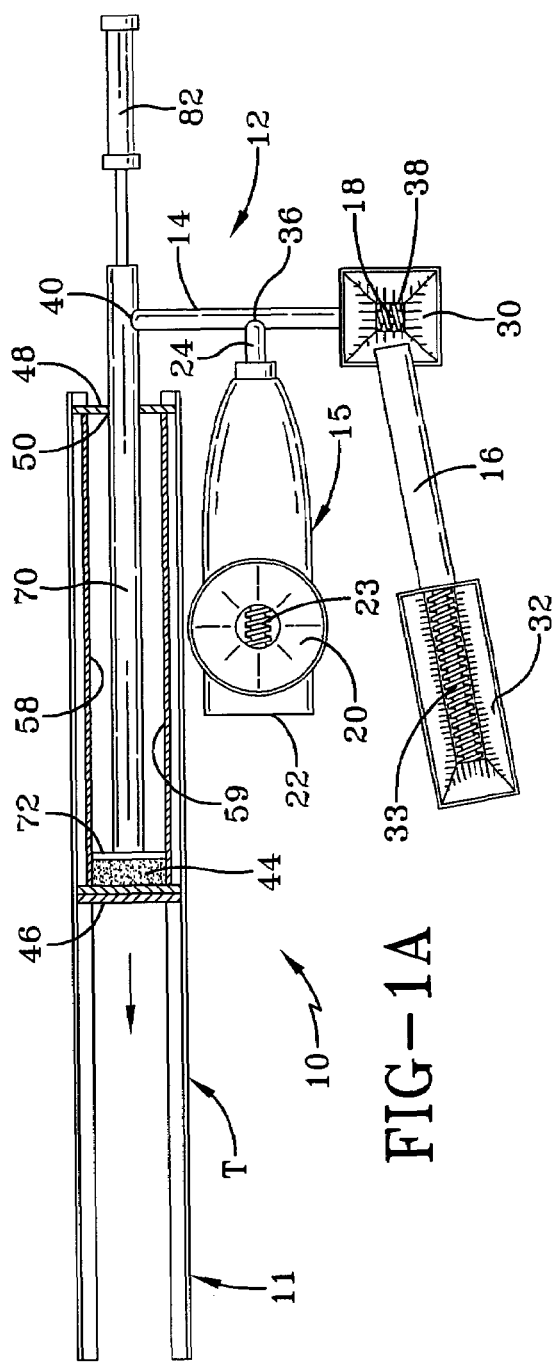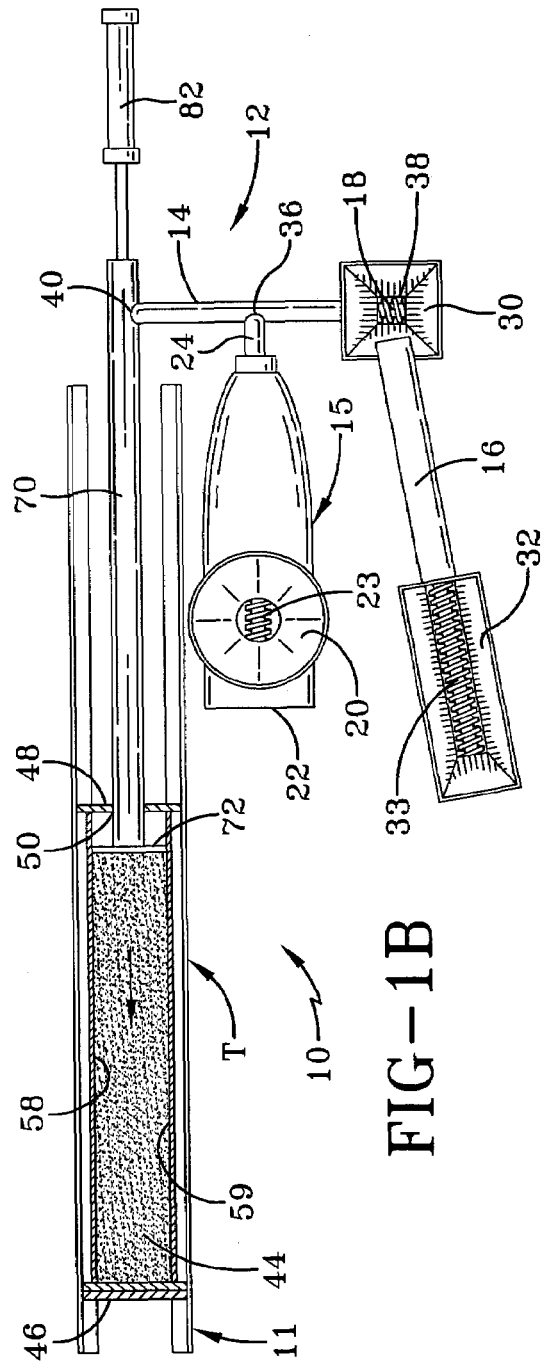

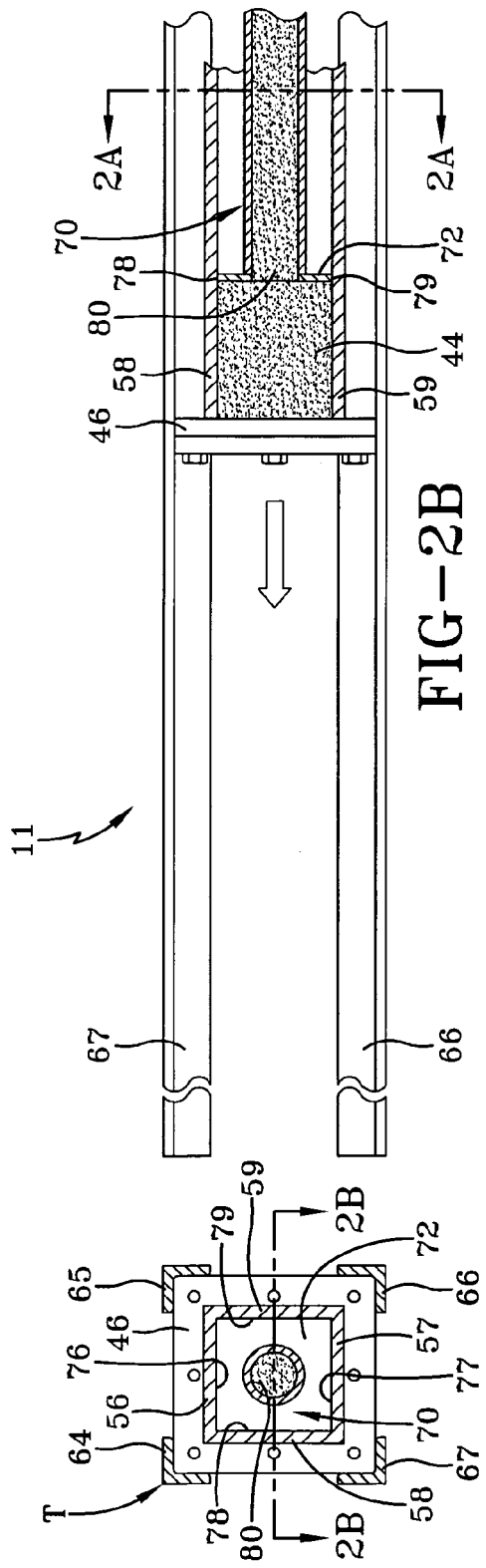
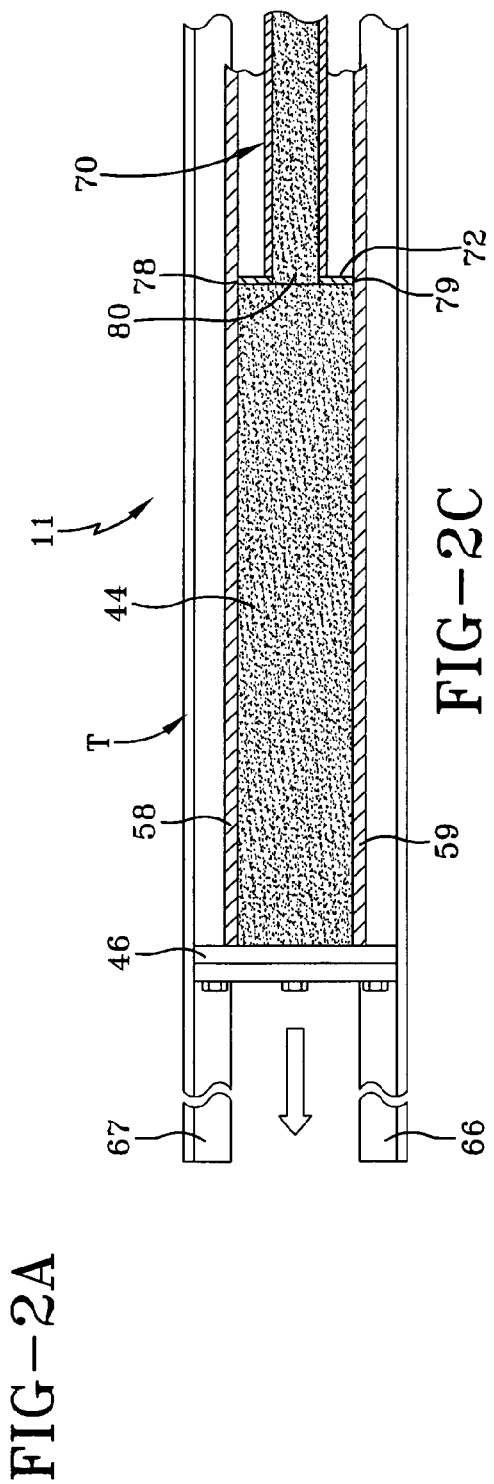

MOLDING SYSTEM

RELATED PATENT APPLICATIONS

None.

TECHNICAL FIELD

The present invention generally relates to a molding system using a mold apparatus to form an elongate article of polymeric material reinforced with tire pieces. More particularly, the present invention relates to a molding system using a mold apparatus configured to form an elongate article from a slurry of polymeric material and tire pieces, where the elongate article has high rigidity and good durability. More specifically, the present invention relates to a molding system using a mold apparatus having a variably-sized mold cavity, where the length of an elongate article formed by the mold apparatus is proportional to the amount of slurry that enters the variably-sized mold cavity.

BACKGROUND OF THE INVENTION

The disposal of scrap or used tires poses a serious threat to our environment. Unlike other waste products, tires do not readily break down in air or soil. It has been estimated that three billion tires have been discarded into U.S. dumps and land fills. Often, whole tires are simply piled onto vacant space within the dump, creating an eyesore. There, the inner cavities of these tires collect rain water and provide a breeding ground for mosquitoes. As a further hazard, the discarded tires in these piles are often worn to the point where their reinforcing wires are exposed. The exposed wire can injure persons handling the tires or children that attempt to climb the piles.

In other instances, the tires are buried. However, chemical reactions between the tires, soil, and air trapped in the inner cavities can create sufficient heat to ignite the tires, creating a dangerous fire hazard. For these reasons, there have been many attempts to recycle tires into useful products.

Attempts to recycle and reuse tires have focused on several techniques, including reclaiming the rubber from the tires through chemical processes, ultrasonic devulcanization, and grinding. Thereafter, the reclaimed rubber is mixed with other components during subsequent processing. However, each of these reclaiming techniques requires that the non-rubber materials, such as the metal belts used in belted tires, be removed from the tires before processing can begin. Consequently, each of these reclaiming techniques can be complicated and costly. Consequently, it is desirable to recycle and reuse tires without separating the rubber from the non-rubber materials.

U.S. Pat. No. 6,583,211 describes a process where pieces of cut tires are combined with thermosetting material, thermoplastic material, or mixtures thereof, in a mold to produce a composite material having high rigidity. For example, the tire pieces are mixed with liquified thermosetting and/or thermoplastic materials to form a flowable melt of composite material which is subsequently molded into a desired shape.

Because such tire pieces damage extrusion and injection molding dies when the flowable melt is flowing therethrough, fixed-size molds have been necessary to shape the composite material. These fixed-size molds are closed upon filling to allow the material therein to set. As the material sets, significant pressures are developed inside the mold. These fixed-size molds are able to form the composite material into inexpensive, useful articles. But as their name suggests, these fixed-size molds are fixed in shape and volume, and new molds must be provided to produce differently sized articles Consequently, if the composite material is used in making an elongate article such as an elongate beam, a mold must be provided that is at least as long as the desired length of the elongate beam. For example, if the mold is longer than the desired length of the elongate beam, then the resulting elongate beam can be cut to length. However, if the mold is shorter than the desired length of the elongate beam, then a new mold must be provided to accommodate the desired length of the elongate beam. Either way, material may be wasted or a new mold must provided. Moreover, articles of greater size produce higher pressures within the fixed-size molds, to the point that, large articles (including elongate beams) cannot be contained without causing such fixed-size molds to break.

As such, there is a need for molding process used to mold elongate articles formed from a composite materials including tire pieces that overcomes the deficiencies of molding processes using fixed-size molds.

SUMMARY OF THE INVENTION

To that end, a molding system including a variably-sized mold cavity, wherein the volume of the cavity increases proportionately to the amount of composite material that enters the mold is proposed. As such, desired length for an elongate article can be provided without having to provide different molds.

BRIEF DESCRIPTION OF THE DRAWINGS

FIG. 1A is a plan view of a molding system according to the present invention including a slurry injection tube that provides a flowable melt of composite material reinforced with tire pieces into a mold that is moveable relative to the slurry injection tube to define a variably-sized mold cavity, where the molding system is depicted in a position where a relatively small amount of composite material has entered the mold;

FIG. 1B is a plan view of the molding system according to the present invention similar to FIG. 1A, where additional composite material has entered the variably-sized mold cavity, thereby displacing the mold further outward relative to the slurry injection tube;

FIG. 2A is a cross-sectional view of a track supporting the mold and a back stop of the mold taken along line 2A-2A of FIG. 2B;

FIG. 2B is a partially fragmented cross-sectional view of the track and the mold supported by the track, where the variably-sized mold cavity is relatively small; and FIG. 2C is a partially fragmented cross-sectional view of the track and the mold supported by the track, where the variably-sized mold cavity is relatively large.

DETAILED DESCRIPTION OF THE INVENTION

The molding system according to the present invention is generally indicated by the numeral 10 in the accompanying drawings. The molding system 10 may be used to produce an elongate article (preferably an elongate beam) formed of composite material such as a polymeric material reinforced with tire pieces. As such, in such a composite material, the polymeric material serves as the matrix of the elongate article throughout which the tire pieces are entrained. The molding system 10 includes a mold apparatus 11 which is adjustable to form an elongate article with a length proportional to the amount of slurry that is fed thereto.

Before entering the mold apparatus 11, the polymeric material and tire pieces are mixed in a mixing apparatus 12 to form a flowable melt (or slurry) of composite material. The mixing apparatus 12 includes a mixing tube 14 to which a polymeric material feed assembly 15 and a tire-piece infeed chute 16 are connected. As such, the polymeric material in liquid form is fed by the polymeric material feed assembly 15, and the tire pieces are fed by the tire-piece infeed chute 16, into the mixing tube 14 to facilitate their combination. To that end, a mixer, such as a screw 18, which extends through the interior of the mixing tube 14, rotates to mix the liquified polymeric material and tire pieces together. After mixing of the liquified polymeric material and tire pieces, the slurry resulting therefrom is fed into the mold apparatus 11.

The liquified polymeric material may be generated from raw polymeric material pellets in the polymeric material feed assembly 15, and this liquified polymeric material is supplied to the mixing tube 14. For example, the polymeric material feed assembly 15 includes a hopper 20 in which the raw polymeric material pellets are initially received. Ideally, the hopper 20 is conically-shaped to funnel the raw polymeric material pellets into a barrel 22.

The barrel 22 is also part of the polymeric material feed assembly 15, and includes a screw depicted in FIGS. 1A and 1B with the numeral 23. The screw 23 supplies heat (via the friction generated through its rotation) to liquify the raw polymeric material pellets, and, simultaneously, pushes the liquified polymeric material out of the barrel 22. The barrel 22 is connected to an outlet tube 24, which, as seen in FIGS. 1A and 1B, is connected to the mixing tube 14. As such, the screw 23 forces the liquified polymeric material out of the barrel 22, through the outlet tube 24, and into the mixing tube 14.

The tire pieces are fed to the mixing tube 14 using an infeed hopper 30 which is connected thereto. For example, the tire-piece infeed chute 16 supplies the infeed hopper 30 with tire pieces, and the infeed hopper 30 funnels the tire pieces into the mixing tube 14. Before entering the infeed hopper 30, the tire pieces are supplied to the tire-piece infeed chute 16 via a storage hopper 32. The storage hopper 32 stores the tire pieces before the tire pieces are pushed by a screw depicted in FIGS. 1A and 1B with the numeral 33 through the tire-piece infeed chute 16.

The tire pieces may be formed using any known process including a cutting or a shredding assembly (not shown). In fact, for improved material strength, tire pieces including reinforcing belt, cords, or wires may be used. The cutting or shredding assembly initially cuts whole tires into strips. To prepare such strips, it is not necessary to remove the metal reinforcing belts, cords, or wires, or other non rubber components commonly used in tires. Thereafter, the shredding assembly tears the strips into the tire pieces used to reinforce the elongate article. The tire pieces do not have to be any particular shape, and may be rectangular, circular, cubic, spheroidal, elongated, thread-like, or combinations thereof. While any size may be used, tire pieces sized to be larger than one (1) inch in at least one direction were found suitable in one application.

The infeed hopper 30 is attached to a first mixing tube inlet 36, and the outlet tube 24 (of the polymeric material feed assembly 15) is attached to a second mixing tube inlet 38. As seen in FIG. 1, the first mixing tube inlet 36 is positioned upstream of the second mixing tube inlet 38, and both the first mixing tube inlet 36 and second mixing tube inlet 38 are positioned upstream of the mixing tube outlet 40. The mixing tube outlet 40 is connected to the mold apparatus 11, and therefore, after the liquified polymeric material and tire pieces are mixed in the mixing tube 14, the resulting slurry is fed to the mold apparatus 11 through the mixing tube outlet 40.

The mold apparatus 11 is configured to produce an elongate article with a length proportional to the amount of slurry which enters the mold apparatus 11 through the mixing tube outlet 40. To that end, the mold apparatus 11 includes a mold 42 that moves relative to an injection tube to progressively increase the volume of the mold 42. In the example shown, the mold 42 is axially moveable to form elongate articles. As shown in FIGS. 1A, 1B, mold 42 may slide, in the mold apparatus 11, on a track T to increase the size of a mold cavity 44 formed therein. As seen in FIGS. 1A and 1B, the mold cavity 44, in which the elongate article is formed, is partially defined by the interior of the mold 42. As discussed below, the length of the mold cavity 44 (and, hence, the length of the elongate article formed therein) can depend on the location of the mold 42 relative to the track T.

The mold 42, although having a square cross-sectional shape as seen in FIG. 2A, can have any desired cross-sectional shape. As appreciated by those skilled in the art, varying the cross-sectional shape of the mold 42 will alter the cross-sectional shape of an elongate article formed therein.

As seen in FIGS. 2A-C, the mold 42 includes a first end plate 46, and, as seen in FIGS. 1A and 1B, includes a second end plate 48 defining an aperture 50. Both the first end plate 46 and second end plate 48 can have square shapes with approximately matching orientations. As discussed below, the four (4) corners of each the first end plate 46 and second end plate 48 (FIGS. 1A and 1B) are supported by the track T. As seen in FIG. 2A, the mold 42 can include four (4) side walls 56, 57, 58, and 59 that extend between the first end plate 46 and second end plate 48 (FIGS. 1A and 1B). In the example shown in FIG. 2A, the four (4) side walls 56, 57, 58, and 59 are arranged perpendicular with one another to form a box-like profile. These four (4) side walls 56, 57, 58, and 59, together with the first end plate 46 and second end plate 48, define the interior of the mold 42. As appreciated by those skilled in the art, the number of walls and their size will be dictated by a given application. Therefore, any number of walls may be used including a single wall. Thus, a single approximately cylindrical wall (or various pluralities of side walls) can be substituted for the four (4) side walls 56, 57, 58, and 59 to produce elongate articles with various cross-sectional shapes.

The mold 42 is moveably supported (or carried) on the track T. As will be appreciated, any frame capable of supporting the mold 42, and allowing it to move relative to the frame and/or a slurry injection tube 70 (as described more completely below) may be used in place of the track T. As depicted in FIGS. 1A, 1B, 2A, 2B, and 2C, the track T is fixed in position, and is formed from four (4) track members 64, 65, 66, and 67 to accommodate the configuration of the mold 42. The track members 64, 65, 66, and 67 can be L-shaped rails (FIG. 2A) positioned at the corners of the mold 42. As such, each of the track members 64, 65, 66 and 67 are configured to receive one of the four (4) corners of the first end plate 46 and second end plate 48 to allow the mold 42 to slide therealong. As appreciated by those skilled in the art, the track members 64, 65, 66, and 67 could be provided with bearings to facilitate movement of the mold 42 on the track T.

Extending through the aperture 50 of the second end plate 48 into the interior of the mold 42, is the slurry injection tube 70. The slurry injection tube 70, like the track T, may be fixed. As seen in FIGS. 1A and 1B, the mixing tube outlet 40 is interconnected with one end of the slurry injection tube 70.

The other end of the slurry injection tube 70, as discussed above, extends into the interior of the mold 42 through the aperture 50.

As seen best in FIGS. 2B and 2C, the distal end of the slurry injection tube 70 (which extends into the interior of the mold 42) includes an apertured flange 72. The apertured flange 72 extends radially outward from the slurry injection tube 70, and is sized slightly smaller than the interior of the mold 42. To accommodate the configuration of the mold 42, the slurry injection tube 70 includes four (4) edges 76, 77, 78, and 79 which interface with and can seal against the interior surfaces of the side walls extending between the first end plate 46 and second end plate 48. The aperture 80 formed in the apertured flange 72 defines the exit of the slurry injection tube 70, and allows the slurry received in the slurry injection tube 70 from the mixing tube 14 (through the mixing tube outlet 40) to be injected into the interior of the mold 42.

The slurry is pressurized upon entering the slurry injection tube 70 using, for example, a hydraulic ram 82. The hydraulic ram 82 may reciprocate and is operatively connected to the slurry injection tube 70, such that, when the hydraulic ram 82 intermittently reciprocates, slurry is pushed into the interior of the mold 42.

Because the slurry is under pressure as it enters the interior of the mold 42, the pressurized slurry forces the mold 42 to move along the track T away from the slurry injection tube 70 (to the left as seen in FIGS. 2B and 2C). In doing so, as seen in the difference depicted by FIGS. 2B and 2C, the mold cavity 44 increases in length to accommodate more and more slurry. That is, the mold cavity 44, defined as the area of the interior of the mold 42 bounded by the apertured flange 72, changes in length (as the mold 42 moves relative to the slurry injection tube 70) according to the amount of slurry which exits the slurry injection tube 70. Consequently, the mold cavity 44 is variably sized, and the length of the elongate article formed therein, is proportional to the amount of slurry that exits the slurry injection tube 70. As such, the length of the elongate article is primarily constrained only by the length of the track T and mold 42.

In light of the foregoing, it should thus be evident that a molding system according to the concepts of the present invention substantially improves the art. While, in accordance with the patent statutes, only the preferred embodiment of the present invention has been described in detail hereinabove, the present invention is not to be limited thereto or thereby. It will be appreciated that various modifications may be made to the above-described embodiment without departing from the spirit of the invention. Therefore, to appreciate the scope of the invention, reference should be made to the following claims.

What is claimed is:

1. A molding system for forming an article of composite material, comprising:
    a track including at least three track members having L-shapes;
    a mold supported by, and capable of movement relative to said track, said mold including a first end plate, a second end plate defining an aperture, and at least three side walls extending between said first end plate and said second end plate, said first end plate having at least three corners and said second end plate having at least three corners, each of said at least three track members of said track supporting one of said at least three corners of said first end plate and one of said at least three corners of said second end plate; and
    an injection tube extending through said aperture into the interior of said mold, said injection tube including a flange extending radially outward therefrom to provide at least three edges, each of which interface with one of said at least three side walls of said mold, said injection tube being connected to a source of the composite material, and injection of the composite material through said injection tube causes movement between said mold and said injection tube.

2. A molding system according to claim 1, wherein said first end plate, said flange, and the interior surfaces of said at least three side walls define a mold cavity, the length of the mold cavity depending on the position of said mold relative to said track.

3. A molding system according to claim 2, wherein said at least three edges of said flange seal against the interior surfaces of said at least three side walls so that said mold moves relative to said track according to the amount of composite material exiting said injection tube.

4. A molding system according to claim 1, wherein, when the composite material enters the interior of said mold through said injection tube, said at least three edges of said flange seal against the interior surfaces of said at three side walls of said mold, said mold moving relative to said track according to the amount of composite material exiting said injection tube.

5. A molding system according to claim 4, wherein said first end plate, said flange, and the interior surfaces of said at least three side walls define a mold cavity, said mold cavity varying in length according to the position of said mold relative said injection tube.

6. A molding system for forming an article of composite material, comprising:
    a track having at four track members;
    a mold supported by, and capable of movement relative to, said track, said mold including a first end plate having four corners, a second end plate having four corners, said second end plate defining an aperture, and four side walls extending between said first end plate and said second end plate, wherein each of said four track members supports one of said four corners of said first end plate and one of said four corners of said second end plate; and
    an injection tube connected to a source of composite material extending through said aperture in said second end plate into the interior of said mold, said injection tube including a flange having four edges, wherein each of said four edges interfaces with the interior surface of one of said four side walls, and injection of the composite material through said injection tube causes movement between said mold and said injection tube.

7. A molding system according to claim 6, wherein said first end plate, said flange, and the interior surfaces of said four side walls define a mold cavity, the length of the mold cavity depending on the position of said mold relative to said flange.

8. A molding system according to claim 7, wherein said four track members have L-shapes, and said first end plate and said second end plate have rectangular shapes.

* * * * *